April 7, 1964   J. ZURICK   3,127,664
METHOD FOR FRACTURING SOCKETS OF BALL AND SOCKET BEARINGS
Filed Dec. 29, 1961   3 Sheets-Sheet 1
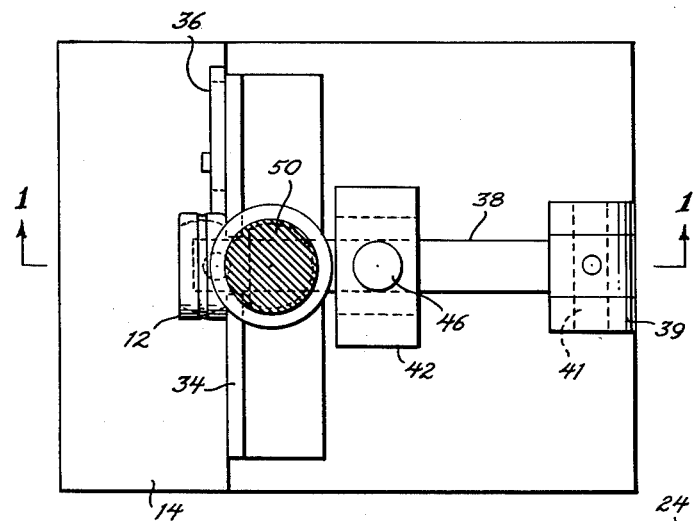
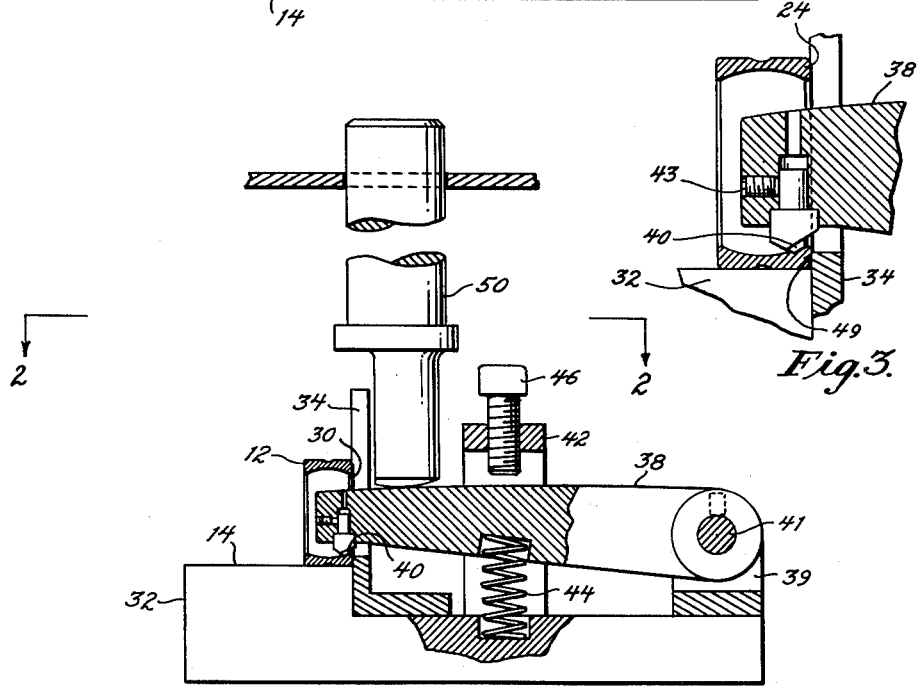
INVENTOR.
JOSEPH ZURICK
BY Peter J. Patane
HIS ATTORNEY

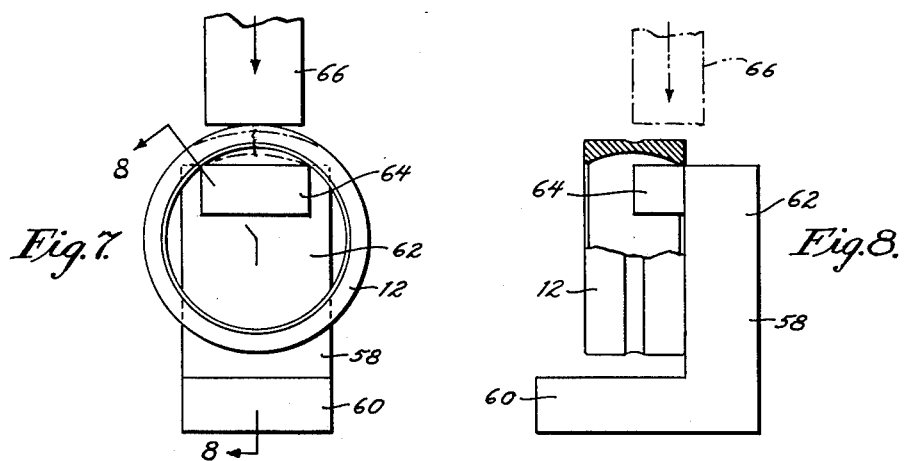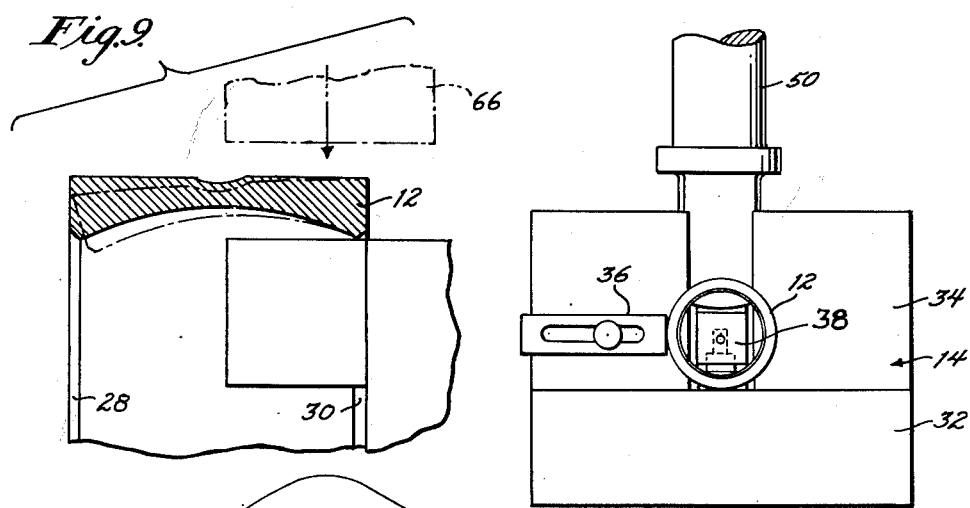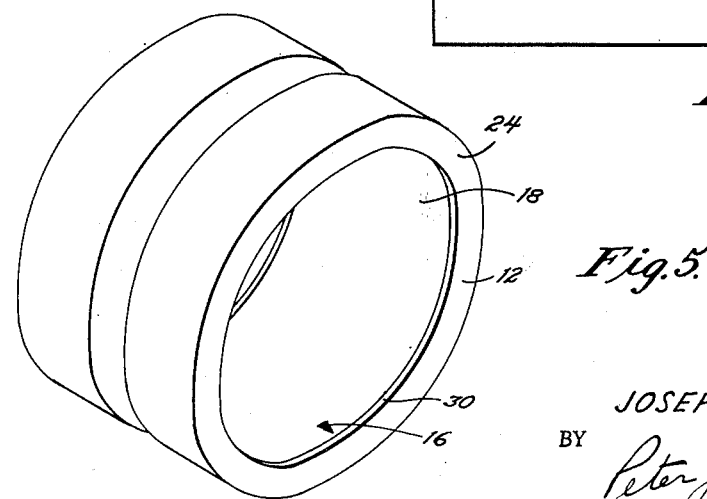

April 7, 1964  J. ZURICK  3,127,664
METHOD FOR FRACTURING SOCKETS OF BALL AND SOCKET BEARINGS
Filed Dec. 29, 1961  3 Sheets-Sheet 3
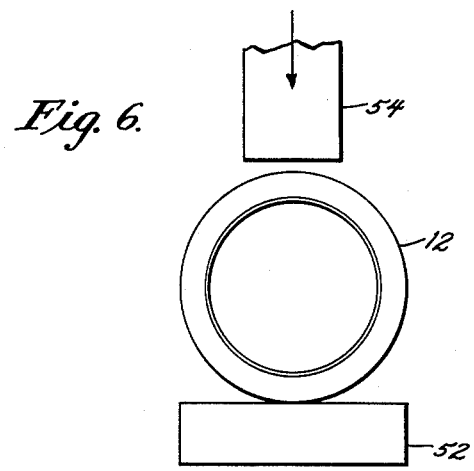
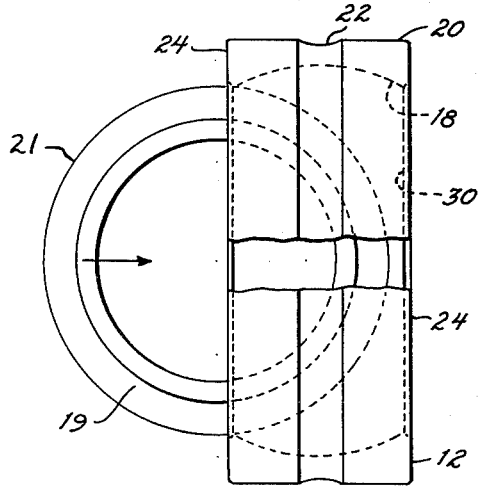
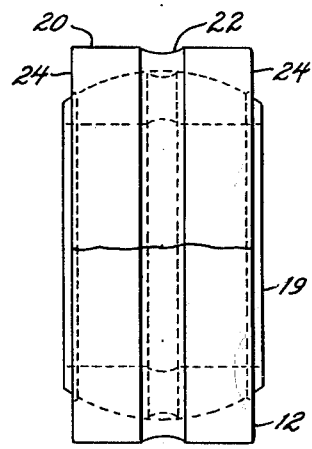
INVENTOR.
JOSEPH ZURICK
BY Peter J. Patane
HIS ATTORNEY United States Patent Office 3,127,664
Patented Apr. 7, 1964

3,127,664
METHOD FOR FRACTURING SOCKETS OF BALL AND SOCKET BEARINGS
Joseph Zurick, West Trenton, N.J., assignor to Roller Bearing Company of America, Trenton, N.J., a corporation of New Jersey
Filed Dec. 29, 1961, Ser. No. 163,300
5 Claims. (Cl. 29—149.5)

This invention relates to an improved method for fracturing annular race members of bearings and more particularly to an improved method and improved apparatus for fracturing the outer socket member of a self-locking, self-aligning ball and socket bearing of the class in which the socket is fractured to facilitate entry of the ball member.

Self-aligning bearings of the spherical type in which the ball bearing member is retained in locking engagement with the outer annular socket member when in normal position in the socket are generally well known in the bearing art. Previously the socket members of the self-aligning bearings have either been of the two piece type that have been provided with retaining rings to secure them in assembled position, or of the tongue and groove arrangement to provide locking engagement with the ball member after the latter is assembled with the socket member in its normal operating position. Also, other self-aligning bearings have been provided with a one piece outer race, fractured longitudinally at one place only, but the fracturing thereof has been relatively complicated.

This invention provides an improved method for fracturing the socket which achieves the desired result with one small notch in the internally concave surface of the socket. One small notch of V-shape in depth is cut in the internal surface of the socket adjacent the edge formed by this surface and an end face. Thereafter, the socket is suitably supported on a plate and struck an impact blow on its outer cylindrical surface, by a non-pointed ram. A single fracture results extending longitudinally through the notch from one end face to the other.

The socket is of a material that is sufficiently resilient so that no substantial permanent deformation takes place and which permits expansion of the ring sufficiently to allow entry of the ball bearing member after which the socket contracts into locking engagement with the ball bearing member.

Alternatively, a fixture may be provided for suspending the socket in position to receive the impact blow radially on the outer cylindrical surface without a corresponding equal and opposite force being imposed on the outer surface of the socket in the zone radially opposite the ram.

The foregoing is accomplished by supporting the socket so that the notch is between two points of support, the two points of support being on the internal edge formed by the internal concave surface and one end face. When the socket is thus supported and struck an impact blow by a ram, the portion between the supported points deforms momentarily radially inwardly and bends about the points of support as fulcrums, resulting in a single longitudinal fracture through the notch.

An object of this invention is to provide a simplified method for singly fracturing an annular member with the least cutting or indenting of the annular member.

Another object of this invention is to provide a simplified method for singly fracturing an annular member which uses a plain ram tool to supply the impact force to the annular member.

The principles of this invention, and the best modes contemplated for carrying out the invention will more fully appear from the following description and accompanying drawings in illustration thereof.

In the drawings:
FIG. 1 is a side elevation, partly in section, of the apparatus for notching the internal surface of the socket, taken along the line 1—1 in FIG. 2;
FIG. 2 is a top view taken along the line 2—2 in FIG. 1;
FIG. 3 is an enlarged view of the portion of FIG. 1 illustrating the socket, the notching tool and the latter's supporting arm;
FIG. 4 is a front elevation of the notching apparatus illustrated in FIGS. 1 to 3, inclusive;
FIG. 5 is a perspective view of a socket member after notching and before fracturing thereof;
FIG. 6 is a front elevation of a plate and ram for fracturing the socket illustrated;
FIG. 7 is a front elevation of an alternative fixture and ram for fracturing the socket illustrated, the socket being suspended on the fixture and deformed upon being struck by the ram as shown in dotted lines;
FIG. 8 is a side elevation of the fixture, ram and socket illustrated in FIG. 7, the socket being broken away partially and illustrated in section to more clearly illustrate the function of the fixture;
FIG. 9 is an enlarged view of a portion of FIG. 8 illustrating the deformation of the socket upon being struck by the ram in dotted lines;
FIG. 10 is a side elevation of the socket expanded sufficiently to allow entry of the ball bearing;
FIG. 11 is a side elevation of the socket and ball bearing in fully assembled condition.

Referring to FIGS. 1 to 4 of the drawings, the socket or outer annular race 12 is illustrated as positioned in a notching apparatus 14 for cutting a notch 16 (FIG. 5) on the internal, concave spherical annular surface 18 intended to engage and receive a unitary (one-piece) ball bearing component 19 (FIGS. 10 and 11), the latter having an outside spherical-like surface 21 carefully matched with the surface 18. The outer surface of the socket 12 is generally cylindrical, as illustrated, but may be provided with a central groove 22.

To form the socket 12 a relatively soft but resilient piece of steel tubing is cut to the desired length and machined to form the illustrated inner and outer surfaces. The end faces 24 are formed parallel to each other and the intersection of the internal surface with the intersection of the end faces and internal surface being chamfered, as illustrated at 28 and 30, to provide two annular beveled surfaces.

The socket 12 is placed upon a support plate 32 of the notching apparatus 14 and against the upstanding plate 34 and the adjustable stop 36 for centering the socket with respect to pivotal arm 38, the latter carrying a notching tool 40 at its forward, or left hand end, as viewed in FIG. 1.

The forward end of the arm 38 is provided with a recess to receive the upper end of the notching tool 40 which may be secured in position by a set screw 43 disposed perpendicular thereto, as illustrated.

The arm 38 pivots about a pin 41 supported in bearings provided by a collar 39 secured to the bottom plate 32 and extends through an inverted U-shaped yoke 42. Between the legs of the yoke 42, a spring 44 is seated in a depression in the bottom plate 32 and a depression in the underside of the arm 38, the spring 44 biasing the arm 38 upwardly against an adjustable stop 46 provided by a threaded screw extending through a threaded hole in the top part of the yoke 42. The spring 44 and the stop 46 jointly center the left hand portion of the arm 38 so that the bottom portion of the socket 12 can be freely inserted between the cutting tool 40 and the surface of the bottom plate 32 and the left hand upper portion of the arm 38 is at all times spaced from the socket 12.

A ram 50 is positioned over the forward portion of the arm 38, between the plate 34 and yoke 42, but freely spaced therefrom as illustrated, and prior to the actual cutting operation, the nose of the ram 50 is spaced from the arm 38.

When it is desired to notch a socket, the socket is placed in the position illustrated in FIG. 1, so that the forward end of the arm 38 extends partly into the interior of the socket, with cutting tool 40 positioned as illustrated. Thereafter, a suitable impact force is applied to the ram 50, by means not illustrated, to cause the ram to forcefully impinge upon the arm 38 with a force of sufficient magnitude to cut a notch of V-shape, in depth in the internal surface of the socket, adjacent to but slightly spaced from the bevel 30. The shape of the tool is such that the notch has a triangular shape, in elevation, when viewed from the top, as illustrated in FIG. 5, the leading edge thereof being adjacent to but spaced from the beveled surface 30.

If desired, a projection 49 (FIG. 3) may be formed on the plate 34 so as to slightly indent the socket end face 24 when the socket 12 is abutted against the plate 34, merely for the purpose of subsequently facilitating the location of the portion of the socket to which the notch has been applied, which is an aid in correctly positioning the socket for splitting thereof.

After the notch is formed on the socket it is heat treated to harden it and thereafter placed upon a plate 52 (FIG. 6) with the notch 16 diametrically aligned with the longitudinal axis of the ram 54 and the notched portion of the socket resting upon the plate 52. The socket is then struck an impact blow by the flat faced ram 54 radially opposite the portion that is notched, and in such a way that the force of the ram is concentrated between the end faces 24 to minimize cocking of the socket, momentarily deforming the socket and causing it to split or fracture along the portion of the socket resting upon the plate 52 longitudinally but only through the notch 16 and not the portion struck by the ram 54.

Alternatively after the socket is notched, as described, it is suspended as illustrated in FIGS. 7 and 8 on a cracking fixture 58. The cracking fixture comprises a base plate 60 and a vertical plate 62, the latter having a projecting short finger 64, which extends into the interior of the socket only about half way. The socket is placed on the finger 64 so that the notch is in approximately the middle of the finger 64, as illustrated in FIG. 7, and in the middle of the cracking ram 66.

Two points of support are provided by the finger 64, one of which is illustrated in FIGS. 8 and 9, the two points being disposed one on each side of the notch.

When the socket is struck by the ram 66, the portion of the socket between the two points of support tends to be momentarily deformed, downwardly as illustrated in FIG. 7. The ram is positioned with respect to the support points, as illustrated in FIG. 9, so that the impact force can be considered as being concentrated to the left of the support points, tending to pivot the portion of the socket between the support points downwardly, deforming this socket portion momentarily to the position illustrated in broken lines in FIG. 9. Since no restraint is provided, as illustrated, on the portion of the socket opposite the supported portion, the vertical plate 62 prevents the socket from twisting counterclockwise, as viewed in FIG. 8, when struck by the ram. Also, the material from which the socket 12 is made and the impact force are such that no excessive permanent deformation of the socket takes place.

The various elements are arranged so that the axis along which the ram moves is parallel to the face of the vertical plate 62 and the finger 64 extends at a right angle thereto. The end face of the socket which abuts the face of the vertical plate 62 is also perpendicular to the longitudinal axis of the socket. Since the outer surface of the socket is cylindrical and the surface of the ram which contacts it is flat and horizontal, there is a minimum tendency toward cocking of the socket in any direction except counterclockwise in FIG. 8, which is resisted by the vertical plate 62 over a wide area of contact between the end face of the socket and the face of the vertical plate.

To assemble the socket and ball bearing, after the socket is formed and split as heretofore described, the inner or ball member 19 is positioned with respect to the socket 12, as illustrated in FIG. 10, and forced into locking engagement with the socket 12 by applying a longitudinal force to the ball bearing 19 while longitudinal movement of the socket is restrained. The material of the socket is sufficiently resilient so that the ends of the socket at the fracture spread apart sufficiently to permit entry of the socket and thereafter the force on the ball bearing is terminated and the socket ends spring back into abutment with each other, when the longitudinal vertical plane of the ball becomes aligned with the medial plane of the socket. Thereafter, the ball is rotated 90° to bring into coincidence the medial plane of the ball with the medial plane of the socket. As will be understood, if it is necessary to disassemble the ball bearing from the socket, this can be accomplished by rotating the ball 90° relative to the socket from the position illustrated in FIG. 11 and the application of a sufficient longitudinal force on the ball bearing, while longitudinal movement of the socket is restrained, at which time the ends of the socket will spread apart sufficiently to permit the removal of the ball bearing and thereafter the ends will spring back after removal of the ball bearing.

From the foregoing it is seen that an economical, improved method and apparatus has been provided for fracturing bearing sockets.

Having described the invention, I claim:

1. The method of singly fracturing an outer socket member for a self-aligning, self-locking ball and socket bearing comprising
    forming an annular member with a spherically-curved internally concave annular surface,
    centering said socket member on a fixture for the notching of the socket member,
    cutting a notch of V-shape in depth along a small portion of the internally concave surface and adjacent to but spaced from the edge formed by an end face and said internally concave annular surface,
    supporting said socket member in a fixture for fracturing said socket member, and
    forcefully contacting the outer surface of said socket member with a non-pointed, relatively uniform ram to singly fracture the socket member longitudinally through said notch without fracturing the portion of said socket member disposed generally radially opposite the zone of the notch.

2. The method of making an outer socket member for a self-aligning, self-locking ball and socket bearing comprising
    forming an annular member with a spherically-curved internally concave annular surface,
    notching said internally concave surface at one place adjacent only one of the end faces,
    suspending said annular member at two points located one on each side of the notch on the edge formed by the internally concave surface and adjacent said end face with no radial restraint being provided on the portion of the socket member radially opposite the portion of the socket member which receives the impact force, and
    impact splitting the outer member in the zone of the notch only to provide a single fracture extending longitudinally through said notch by applying a radial force to the outer surface of the outer member in the vicinity of the notch.

3. The method of making an outer socket member for a self-aligning, self-locking ball and socket bearing comprising
forming an annular member with a spherically-curved internally concave annular surface,
centering said socket member on a notching fixture and simultaneously marking the end face of the socket member which abuts the fixture,
notching said internally concave surface at one place adjacent only one of the end faces, and
impact splitting the outer member in the zone of the notch only to provide a single fracture extending longitudinally through said notch by applying a radial force to the outer surface of the outer member in the vicinity of the notch.

4. The method of making an outer socket member for a self-aligning, self-locking ball and socket bearing comprising
forming an annular member with a spherically-curved internally concave annular surface,
nothing a portion of said internal surface adjacent one of the end faces,
suspending said annular member at two points located one on each side of the notch on the same edge formed by the internal surface and an adjacent end face with no radial restraint being provided on the portion of the socket member radially opposite the portion of the socket member which receives the impact force, and
radially inwardly deforming the portion of the socket between the two supporting points and simultaneously bending the same portion of the socket inwardly using the supporting points as fulcrum points, by applying a radially inwardly directed impact force to the outside surface of the socket,
whereby the socket is split in a single fracture longitudinally through said notch.

5. The method of making an annular outer race member for a bearing comprising
forming said outer race member with an internal annular surface,
notching a small portion of said internal surface at one place adjacent only one of the end faces, and
impact splitting the outer race member through the notch only to provide a single longitudinally extending fracture by applying a radial force to the outer surface of the outer race member in the vicinity of the notch.

References Cited in the file of this patent

UNITED STATES PATENTS

| | | | |
|---|---|---|---|
| 1,315,964 | Jantsch | Sept. | 16, 1919 |
| 2,205,731 | Olsen | June | 25, 1940 |
| 2,624,105 | Virtue | Jan. | 6, 1953 |
| 2,741,826 | Hall | Apr. | 17, 1956 |